(No Model.)
T. LOUGHRAN.
TEA POT.
No. 356,484. Patented Jan. 25, 1887.
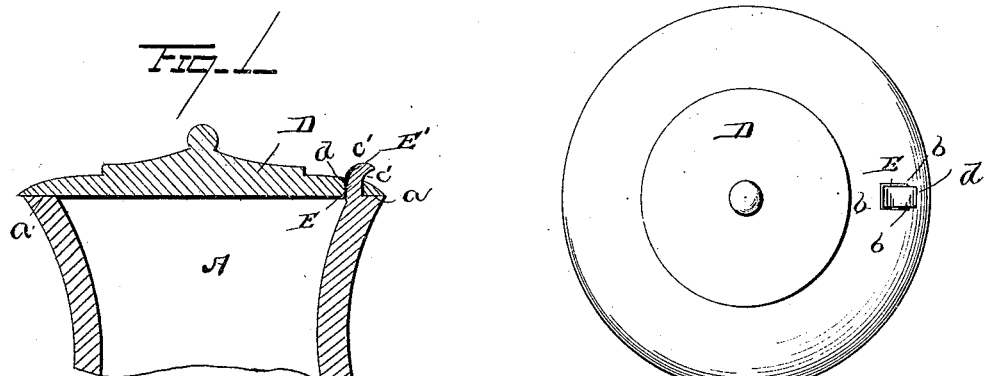
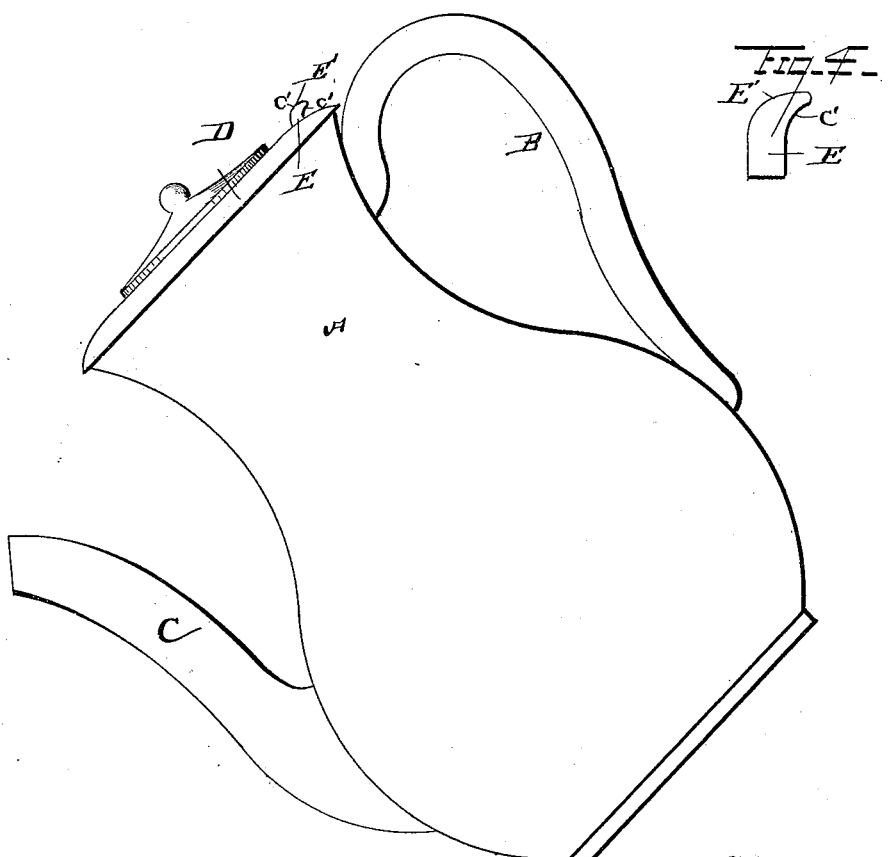
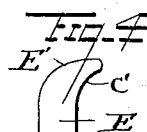
Witnesses
Wm. T. Gill
E. G. Siggers
Inventor
Thomas Loughran
By his Attorneys
C. A. Knowles

UNITED STATES PATENT OFFICE.

THOMAS LOUGHRAN, OF TRENTON, NEW JERSEY.

TEA-POT.

SPECIFICATION forming part of Letters Patent No. 356,484, dated January 25, 1887.

Application filed June 26, 1885. Serial No. 169,890. (No model.)

*To all whom it may concern:*

Be it known that I, THOMAS LOUGHRAN, of the city of Trenton, county of Mercer, and State of New Jersey, have invented new and useful Improvements in Tea-Pots, of which the following is a specification.

My invention relates to that class of tea-pots with removable covers only.

My invention is an improvement in tea-pots; and it consists of the peculiar construction and adaptation of parts, substantially as hereinafter fully set forth, and specifically pointed out in the claim.

The object of my present invention is to provide improved means whereby the lid of a tea-pot is effectually prevented from swinging horizontally to one side or the other of the pot to expose the opening therein through which the water and other substances are introduced, and also which shall prevent the top from vertical displacement when the pot is decanted to empty the contents thereof, while the top can be easily removed by hand, all as described presently.

In the accompanying drawings, which illustrate a tea-pot embodying my invention, Figure 1 is a vertical central sectional view through the upper part of the tea-pot with my invention applied thereto. Fig. 2 is a top plan view of the same. Fig. 3 is a view of a tea-pot with my improvement applied thereto in the position it assumes when emptying the contents thereof into a cup or other vessel. Fig. 4 is a detail view of the retaining-lug.

Referring to the drawings, in which like letters of reference denote similar parts in all the figures, A denotes a tea-pot of ordinary or preferred pattern, which is provided with a handle, B, and a discharge pipe or spout, C, as is usual. The upper end of the receptacle is left open, and the edge surrounding the open end is made comparatively wide or broad, so as to provide an increased bearing-surface, as at $a$, for a lid, D, which rests on the said edge $a$, as is obvious.

E designates a retaining-lug, which is arranged in a vertical position and permanently and immovably affixed to the receptacle at the upper bearing-edge thereof and in close proximity to the handle of the pot. The lug is made substantially square in cross-section to provide the sharp angles and the biting-edges $b$, and the upper end of the lug is curved forwardly to form a lip, E', which is arranged out of line with the lug and overhangs the bearing-surface $a$ of the receptacle, and this curved lip E' is tapered longitudinally and reduced, its upper and lower faces being curved, as at $c\ c'$, to permit the cover D to be easily detached from the receptacle by hand.

The cover D is provided with an opening or aperture, $d$, near one edge, and through this aperture passes the retaining-lug E to prevent any horizontal or vertical swinging movement and displacement of the cover. The aperture $d$ is a trifle larger than the width in cross-section of the lug D, so that the cover is permitted to have a very small amount of play horizontally, which, however, is not sufficient to expose the bearing-edge $a$ and the open end of the receptacle to view, which would allow the steam and heat to escape.

The retaining-lug effectually prevents the cover from having any material swinging movement horizontally, as is obvious, and the tapered and curved lip E' overhangs the cover and effectually prevents the cover from being detached when the receptacle is decanted, the said lip being projected rearwardly of the lid and toward the handle, so that the cover cannot ride upon the lug and become displaced when the rear part of the receptacle is turned upwardly to discharge the contents through the spout C, the upper edge in the periphery of the cover being in contact with the curved rear face, $c'$, of the lug E to more effectually and securely prevent vertical movement of the cover.

When it is desired to remove the cover, the free end thereof is grasped by the hand and elevated so that the edges of the aperture $d$ therein will ride freely over the curved surfaces $c\ c'$ of the retaining-lug until the cover has assumed a vertical position, when it can be easily detached, the longitudinal curves and aperture of the lip of the lug facilitating the removal of the cover. In replacing the cover the above-described operation is reversed.

The parts are simple and strong, and can be manufactured for a trifling sum.

I am aware that it is not new to provide a vertically-swinging cover for a heating-stove with a depending hook or lug, which works in an aperture of the stove-body and forms a hinge or pivot to permanently attach the cover to the stove; and I am also aware that a cover for stoves, tea-kettles, and the like has been provided with a depending cylindrical pivot-pin having a key which works in a circular aperture in the body of the vessel or stove; but such is not my invention.

Having thus fully described my invention, what I claim as new, and desire to secure by Letters Patent, is—

A tea-pot comprising a vessel having a wide bearing-edge, $a$, and a vertical retaining-lug, E, permanently and rigidly affixed thereto, said lug being substantially square in cross-section, and provided with an integral rearwardly-curved lip, E', that is tapered longitudinally, and having the curved outer faces, $c\ c'$, and a removable cover, D, provided with an aperture, $d$, near one edge of a size a little larger than the width in cross-section of the retaining-lug, which passes through the aperture, whereby the lip thereof overhangs the edge of the cover, substantially as described, for the purpose set forth.

In testimony whereof I have hereunto set my name in presence of two subscribing witnesses.

THOMAS LOUGHRAN.

Witnesses:
JOHN E. McKEE.
HARRY S. TAYLOR.